Dec. 17, 1940.        W. B. McPHERREN         2,225,388
                         MILKING DEVICE
                       Filed April 11, 1939
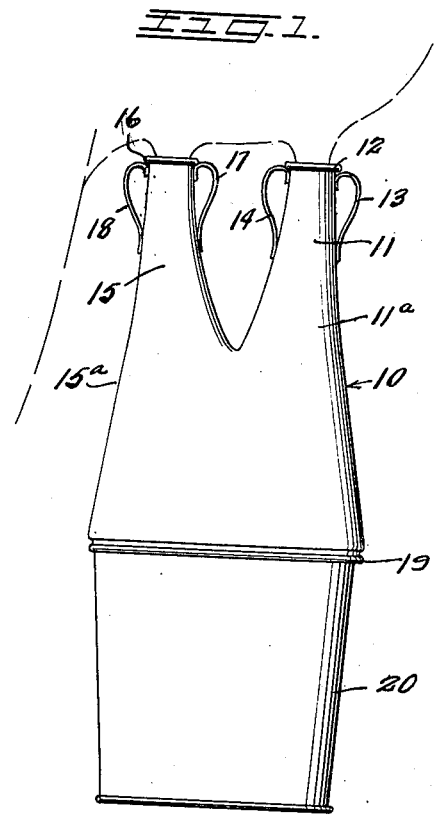
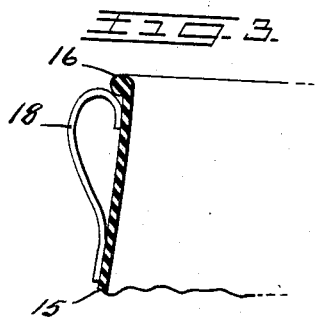
Inventor
WAYNE B. McPHERREN
By Semmes, Keegin & Semmes
Attorneys Patented Dec. 17, 1940

2,225,388

UNITED STATES PATENT OFFICE 2,225,388

MILKING DEVICE

Wayne B. McPherren, Omaha, Nebr.

Application April 11, 1939, Serial No. 267,296

4 Claims. (Cl. 31—81)

The present invention relates generally to a dairy accessory and more particularly to a sanitary milking envelope.

Heretofore, it has always been a problem in the hand milking art to provide a manner of extracting milk from a cow's teat which is efficient and sanitary. Various ways and devices have been employed to accomplish this result. For example, it is old to use teat cups and tubes. Such a use has not been satisfactory because of the awkwardness of operation and the difficulties encountered in the sterilization of the cups and tubes prior to use.

With the above disadvantages in mind it is an object of the present invention to provide a sanitary milking envelope preferably made from one piece of rubber, or any other flexible, lightweight, moisture-proof material.

Another object is to provide a milking envelope having at one end thereof two hollow flexible members each adapted to engage over a cow's teat, and having at the other end thereof a rubber bead adapted to snugly engage over the rim of a milk pail or other receptacle to provide an air-tight jointure.

Another object is to provide a milking envelope or pouch which is manufactured from one piece of rubber, or other moistureproof flexible materials.

Still another object is to provide a milking envelope, which in combination with a milk pail or other container, produces a sanitary milking assembly which prevents the milk from coming in contact with the surrounding air at any time as it passes from the cow's teat to the milk pail.

Another object is to provide a milk envelope which serves as an air-tight cover for the milk container during the milking period and prevents the milk from being splashed or spilt and protects it from exposure to harmful bacteria and foreign matter in the surrounding air.

A further object is to provide a milking envelope in which the hollow portions thereof are large and open enough to permit thorough and easy cleaning and sterilization, including turning the envelope inside out, if necessary.

Yet another object is to provide a milking envelope in which the hollow portions thereof which fit over the cow's teats are of sufficient width so that the milk easily passes therethrough without backing up, and each hollow portion being provided with thumb and finger loops to assist in milking.

Other and further objects and advantages of this invention will be apparent from the detailed disclosure found hereinafter, and as more particularly pointed out in the claims appended thereto.

In the drawing, wherein like numerals refer to like or corresponding parts throughout the several views:

Figure 1 shows a front elevation of the invention embodying the principal features thereof, Figure 2 is an enlarged sectional detail showing the rubber bead portion of the milking envelope which fits over the rim of a milk pail or the like, and Figure 3 is an enlarged sectional detail showing a thumb loop mounted on the exterior portion of the milking envelope.

Referring now to Figure 1 in the drawing, the numeral 10 indicates generally a flexible hollow envelope made of rubber, or any other light-weight, moisture-proof material.

The envelope 10 is provided at the upper portion thereof with a tubular extension 11 having a beaded portion 12 around the circumference of the opening thereof. The tubular member 11 is adapted to snugly engage over a cow's teat, as shown in Figure 1. Loop members 13 and 14 are exteriorly mounted on the opposite sides of the upper portion of the member 11 adjacent the bead 12, and are proportioned to receive the thumb and fingers of the right hand for milking.

There is further provided at the upper portion of the envelope a second tubular member 15 spaced from the member 11 and having a beaded portion 16 similar to the bead 12. The tubular member 15 is adapted to snugly engage over a cow's teat in the same manner as the member 11. Also, loop members 17 and 18 are mounted on the opposite sides of the upper portion of the member 15 to receive the thumb and fingers of the left hand for milking.

The oppositely disposed loop members 13, 14, 17 and 18 may be made of any suitable material and are preferably cemented to the members 11 and 15, respectively.

The side portions 11a and 15a of the envelope 10 flare downwardly and outwardly from the tube members 11 and 15 to afford a free path for the milk.

The lower end of the envelope 10 is provided with a bead 19 which fits snugly over the rim of a milk pail, or the like, 20 to assure an air-tight union.

In the milking operation, the thumb of the right hand is placed in the loop 14 and one or more fingers of the same hand are put into the loop 13. The thumb of the left hand is placed in the loop 17 and one or more fingers of the same hand are placed in the loop 18. The milk as it passes from the cow's teats flows downwardly into the pail 20 without being exposed to the surrounding air. In such a milking operation, the milk reaches the container without coming in contact with any foreign matter which would tend to contaminate it.

It is believed readily apparent from the foregoing description that I have provided a milking accessory that is sanitary, highly efficient and which can be easily and cheaply manufactured. Moreover, the device can be used with any type of pail or receptacle and the milk can pass freely into the receptacle without backing up in the tubular members.

It is to be understood that various modifications of this invention can be constructed by those skilled in the art without departing from the scope thereof, and it is therefore desired to be limited only by the claims appended hereto.

What I claim and desire to secure as my invention is:

1. A milking device of flexible material of one-piece construction having its entire outer surface of tapering formation and having the upper portion thereof bifurcated, each bifurcation having a tapering formation, the inner surfaces of the bifurcations meeting substantially at a point in the longitudinal axis of the device.

2. A milking device comprising a one-piece structure having a lower portion of substantial length and a bifurcated upper portion of lesser length, the structure comprising walls of flexible material having an outer tapering formation and each arm of the bifurcated portion having an outer tapering formation, the upper ends of the bifurcated portions having finger holes to facilitate manipulation of said parts.

3. A milking device consisting of an integral flexible finger-manipulable teat-receiving structure having a receptacle-receiving base portion of one diameter and a central portion of lesser diameter and a bifurcated teat-surrounding portion extending upwardly from the portion of lesser diameter, the base of each arm of said bifurcated portion having a cross-sectional area substantially equal to half the cross-sectional area of the central portion.

4. A flexible, moisture-proof, sanitary milking envelope for use in conjunction with an open pail comprising a hollow, flexible body member of substantially frusto-conical configuration having an open bottom for receiving the upper peripheral edge of the pail, the upper portion of the body member being substantially spaced above the top of the pail when mounted thereon in dome-like manner, and a pair of flexible teat-receiving tubes of frusto-conical configuration extending upwardly from the upper portion of the body member, and communicating therewith, the teat-receiving tubes flaring outwardly from the upper teat-receiving ends thereof to the lower ends thereof and the body member flaring outwardly from its upper to its lower ends to facilitate the unrestricted flow of milk through the teat-receiving tubes and body member into the pail.

WAYNE B. McPHERREN.